April 10, 1934. R. C. BENNER 1,953,983
MANUFACTURE OF RUBBER BONDED ABRASIVE ARTICLES
Filed July 23, 1932 2 Sheets-Sheet 1

INVENTOR.
R. C. Benner

April 10, 1934. R. C. BENNER 1,953,983
MANUFACTURE OF RUBBER BONDED ABRASIVE ARTICLES
Filed July 23, 1932 2 Sheets-Sheet 2
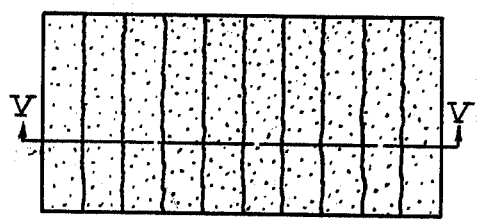
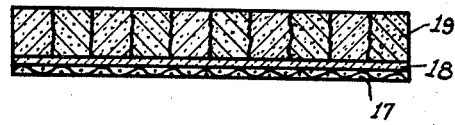
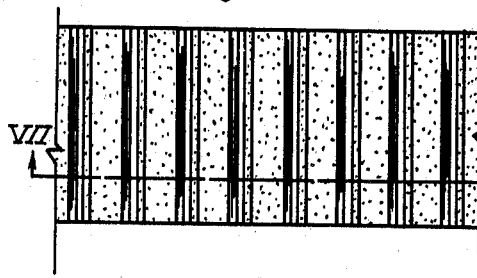
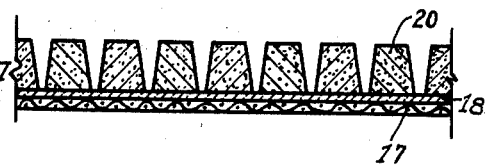
INVENTOR.
R C Benner Patented Apr. 10, 1934

1,953,983

UNITED STATES PATENT OFFICE 1,953,983

MANUFACTURE OF RUBBER BONDED ABRASIVE ARTICLES

Raymond C. Benner, Niagara Falls, N. Y., assignor to The Carborundum Company, Niagara Falls, N. Y., a corporation of Pennsylvania Application July 23, 1932, Serial No. 624,315
In Canada February 7, 1928

10 Claims. (Cl. 51—280)

This application is a continuation in part of my copending application Serial No. 569,885, filed October 20, 1931.

One feature of the present invention relates to the manufacture of rubber bonded abrasive articles such as abrasive disks or belts and, more specifically, to the process of making friable and pliable rubber bonded abrasive articles.

Another feature of the invention relates to a method of modifying the properties of rubber bonded abrasive articles in order to develop certain characteristics required in articles used for polishing soft surfaces and to the application of such articles in a process of polishing.

In making abrasive articles according to my invention, I utilize, as the source of the bond, a dispersion of rubber in an aqueous vehicle which dispersion I have termed rubber butter. Such a dispersion can be prepared in any of a number of ways as is well-known in the art and the practice of my invention is not limited to the use of any particular dispersion. I have found, however, that dispersions in which the rubber particles are protected by an inorganic colloid, such as bentonite clay, have certain advantages over other dispersions, and I therefore prefer to use such a one.

Fundamentally, the process of preparing an artificial dispersion of rubber consists in intimately admixing the rubber and a suitable colloid or dispersing agent, putting the rubber-colloid mixture into such condition that it will mix with sufficient water to disperse the rubber and then disrupting the mass of rubber into very small particles which do not cohere readily and which will remain in suspension in the aqueous vehicle.

I will now describe one process by which dispersions suitable for my purpose are made. It is to be understood, of course, that the example is for illustrative purposes only and that other processes may be used.

Crude rubber in the form known to the trade as "smoked sheet" or "pale crepe" is thoroughly mixed with about 10% by weight of natural clay such as bentonite. The mixing is done concurrently with, or subsequently to, the process known as "breaking down"; that is, the rubber is subjected to a mechanical treatment on regular rubber compounding rolls or by kneading in a machine of the bread mixer type whereby it is rendered more plastic and the bentonite is thoroughly dispersed through the mass of rubber.

The rubber-bentonite mixture is then subjected to a combined stretching and kneading action such as is obtained in a bread mixer (e. g., a so-called "Baker-Perkins mixer") while water is added. It is desirable that the water at first be added in relatively small quantities and that the mass be kneaded until the water is uniformly distributed through the mass. It is convenient to perform this treatment in a jacketed mixer so that the bowl of the mixer can be maintained at a temperature of about 140° Fahr. at this stage and can be raised later when the water has all been incorporated.

The steps just described; namely, adding water and kneading, are repeated until a quantity of water approximately equal to the mass of the rubber has been added. It will be found that as more and more water is added, the quantity of water added each time can be increased without causing difficulties. For example, if too much water be added in the earlier stages of the process, the rubber is likely to cut up into pieces about the size of a small apple and it will be found necessary sometimes to remove some of the water by evaporation in order to get the mass consolidated into a piece which will catch in the blades of the mixer and get a kneading action. With proper care, however, this difficulty can be avoided.

It will be found that as the quantity of water incorporated in the mass increases, the rubber gets softer and "shorter" (by shorter is meant that it loses its stretchiness) and when the quantity mentioned above has been incorporated, the mass will be so soft that it is easily picked apart or penetrated by poking a finger into it.

The bowl of the mixer is then covered to retain the heat and moisture and the temperature of the jacket is raised slowly while the kneading is continued, the blades preferably being rotated more slowly than before. When the temperature of the jacket reaches about 200° Fahr., the mass will suddenly invert from a continuous mass of rubber containing water to a continuous body of water containing rubber dispersed in it. This dispersion of rubber in water, which is a viscous, mushy, semi-solid yet stirrable mass, is the material I have found to be so satisfactory in the manufacture of rubber bonded abrasive articles and which I have termed rubber butter.

As stated above, other processes may be used for preparing the rubber dispersion. For example, rubber may be swollen by soaking it in a suitable "solvent" such as benzol or gasoline to form a fluid which is thin enough to be miscible with water.

The "solvent rubber" may then be mixed with a suitable emulsifying agent such as bentonite, soap, casein, gelatin, glue or the like and a dispersion made by agitating the solvent rubber with the water in the presence of the emulsifier. The benzol or other solvent may then be removed by evaporation, leaving a dispersion of rubber in water protected by the emulsifying agent. Such dispersions are, however, open to one objection—the presence of even small quantities of the rubber solvent in the finished abrasive article detracts from the strength of the article, and it is extremely difficult to remove the last traces of solvent.

Other emulsifying agents than bentonite can be used, provided proper precautions be taken. For example, the protein-bearing materials such as casein, glue or gelatin emit an offensive odor similar to that of burning flesh when they are heated. Since abrasive wheels are frequently employed for dry grinding, if these substances be used it is necessary to provide means for removing the fumes in such cases. Where lubrication or cooling is employed, the wheel is usually kept cool enough to prevent this burning, in which event no trouble from this cause is encountered. Another disadvantage of dispersions protected by these agents resides in the fact that they are less viscous than those prepared with bentonite and viscosity is an important factor in the making of abrasives from rubber dispersions, as will be brought out later.

One of the advantages of artificial rubber dispersions resides in the fact that the unvulcanized rubber from an artificial dispersion adheres to abrasive grain. This adhesion is not, to my knowledge, developed with rubber from any other source, such as latex or sheet rubber. It is this property and the inherent friability which I have been able to increase and control by methods to be disclosed herein, that make possible the articles and processes forming the subject matter of the present invention.

One of the problems encountered by the abrasive industry is the polishing of lacquered surfaces, brought about by the use of the nitrocellulose base lacquers for automobile bodies, furniture, etc. Since my invention is particularly useful in the solution of this problem, a brief discussion of the problem and the solution arrived at will be given.

The first step in the finished coating of an automobile body after the metal has been shaped and cleaned, is to spray the nitrocellulose lacquer over the surface with a gun operated by compressed air. Several such coats are applied, with alternate drying, until a body of lacquer of sufficient thickness is built up. At this time the surface will be irregular and show what is descriptively called an "orange peel" effect. This type of surface is, of course, inherent in the lacquer spraying process. This unevenness must be removed before the final or finishing coat of lacquer can be applied to give the smooth reflective surface required. One of the useful applications of the abrasive articles made in accordance with my invention is in the removal of the excess lacquer and the smoothing of the lacquer surface at this stage. The smoothing of the lacquer has previously been accomplished by hand rubbing the surface with fine grit waterproof abrasive paper in the presence of water. This manual operation is slow and is rather wasteful of the abrasive paper. The smoothing and polishing of a lacquer surface presents a peculiarly difficult problem. A dried lacquer surface is tough, somewhat elastic and, particularly when warmed, gummy and adhesive. It is easily scratched by coarse abrasive particles, which fact complicates the problem since the gumminess of the lacquer tends to agglomerate the abrasive grains, resulting, in effect, in a virtual increase in grit size. Furthermore, the curved surfaces formed on automobile bodies make it necessary that the abrasive must be able to follow irregular contours as well as plane surfaces.

Attempts have been made in the past to apply mechanical polishing to lacquer surfaces, but the results heretofore secured have not been satisfactory. I have found, however, that the smoothing and polishing of lacquer-coated surfaces can be accomplished mechanically in a satisfactory manner by the application thereto of an abrasive article possessing the properties of friability and pliability such as can be secured by an abrasive composition made in accordance with my invention.

By "friability" I mean that the article breaks down very easily when subjected to the comparatively small forces resulting from pressing the rotating article against a soft material such as lacquer. I have found that if attempts are made to polish lacquer surfaces with abrasive articles which are not sufficiently friable, the abrasive surfaces fill or glaze with the lacquer. It is well-known that any abrasive article continues to function by reason of the fact that fresh, sharp abrading surfaces are presented when the old surface becomes too dull or too smooth to cut. In abrading metals these surfaces are usually provided by reason of the fact that the metal offers sufficient resistance to the passage of a dull abrasive grain that the bond is broken away and the dull grain is thereby removed. In abrading a material such as a lacquer, the lacquer is relatively so weak and inherently so gummy that it tends to clog up the abrading surface and thereby glaze the wheel so that it becomes ineffective. Therefore it is necessary that the bond of an article used for abrading lacquer surfaces be readily disrupted or, in other words, possess a high degree of friability.

I believe that when a friable abrasive article is rotated in contact with a lacquer surface, grains of the abrasive are loosened from the bonded abrasive and tend to cut or abrade the lacquer. Since the abrasive article is soft and flexible and compressive, any tendency for these loose grains to cut too deeply or scratch the lacquer, is reduced by the cushioning effect of the disc itself and the loose grains are partially embedded in the soft friable backing formed by the bonded abrasive. Furthermore, the friable composition is such that the loose grains do not agglomerate to form aggregates that might scratch the surface being finished.

The property of friability that adapts my rubber butter bonded abrasives for the grinding of soft surfaces, such as lacquer coats, is a property not commonly found in abrasive bonds. A "soft" abrasive article can be made, of course, by reducing the proportion of bond to abrasive grain. There is, however, a limit to which this reduction may be carried, that is determined, among other things, by the fact that it is impossible to distribute uniformly a very small amount of bond in a relatively large quantity of abrasive grain, which factor causes articles of low bond content to differ in "grade" throughout the article. This condition makes the article useless if carried a degree frequently found necessary to produce the desired "softness". The fact that the degree of adhesion between the bond and the abrasive grain and the toughness of the bond of articles made by my process is such as to make the articles friable, obviates this difficulty and permits the incorporation of sufficient bond to insure substantial uniformity.

The bond formed from the rubber butter has about the right degree of adherence to the abrasive grain to make discs bonded therewith that are suitable for lacquer polishing and, although it has greater adhesion to the abrasive grain than is secured by milling abrasive grains into sheet rubber, which is the usual process of making rubber bonded abrasives, or than is exhibited in articles bonded with the rubber from latex, it nevertheless allows the abrasive grains to break out of the bond sufficiently readily to prevent glazing of the disc in use.

In order to make a satisfactory disc for lacquer polishing, however, it is not sufficient merely to compound in proportions to make a soft rubber bond and cure the article in the usual way. The rubber itself must be treated in some particular way to develop a certain degree of "dryness" and friability not inherent in the usual soft rubber. If this treatment is not applied the rubber will have a tendency to soften in use and "smear" the surface being polished.

One of the methods I have discovered for producing this "dryness" in the rubber comprises curing the article for a longer time than is usual; for example, where a given composition would normally be cured for 40 minutes at 300° Fahr. if the rubber were to be used for ordinary purposes, I cure my abrasive articles for three hours at the same temperature and thereby develop in the bond that necessary property of "dryness" just described. A cure of this kind would never be employed in the usual processes as it would be considered harmful and, in fact, destructive to the rubber.

Another method by which I have been able to develop sufficient "dryness" to the bond is by incorporating certain fillers which are not commonly used in rubber compounding but which I have found develop the property required in articles that are to be used in my lacquer polishing process. For example, I have found that the addition of wood-flour, which is not ordinarily used as a filler for rubber, will develop the friability and "dryness" of the bond required in lacquer polishing discs.

The following is a specific example in which I have set forth the grain size, cements, etc., for making a friable abrasive polishing article suitable for polishing lacquer-coated surfaces.

934 parts by weight of 280 grit silicon carbide abrasive grain are wet with 6 cubic centimeters of a 10% solution of lead acetate in water and the wet grain is then thoroughly mixed with an amount of rubber butter containing 60 parts of rubber and 6 parts of sulphur. The mix is dried at about 150° Fahr. until the moisture is reduced to between 5% and 7%, disintegrated, and further dried, whereupon it is passed through ordinary rubber rolls, which are warmed, and the mixture is thereby compacted and rolled to the desired thickness; for example, to $\frac{1}{16}$ of an inch.

The mixture is then formed into an article as follows: A facing made of the above composition is cemented to a suitable back, such for example, as a 10-16 ounce square cotton canvas, a cloth extensively used in the rubber art and known in rubber tire making as builder's fabric. A soft rubber tie gum for cementing the facing to the fabric backing is prepared by compounding on relatively cold rolls in the usual way the following mixture:

| | Parts by weight |
|---|---|
| Smoked sheet rubber | 54.2 |
| Zinc oxide | 27.0 |
| Sulphur | 2.9 |
| Lamp black | 3.4 |
| Thiocarbanilid | 1.8 |
| Carbon black | 8.5 |
| Mineral rubber | 2.2 |

The mineral rubber employed is an asphaltic material and is well-known in the rubber industry as a softener, being sold under various trade-names, such as "M. R. X." softener.

This tie gum is rolled into a sheet approximately $\frac{1}{16}$ inch thick.

The fabric backing is given a priming coat of a suitable cement, such, for example, as a solution of crude rubber or of the tie gum compound above described, in a solvent such as gasoline, benzol or the like. A cement known to the trade as "Vulcalock" made in accordance with United States Patents 1,744,880; 1,668,235; 1,668,236 and 1,668,237 or one known by the trade name "Darex" may also be employed. After allowing the cement to dry for a few minutes, a sheet of tie gum is applied to the cement surface of the fabric, the excess tie gum being trimmed off. The sheeted abrasive mix, to which two coats of cement have been applied, is then laid on the tie gum, the cement side being, of course, in contact with the tie gum.

A mold of suitable size is prepared by painting the parts which are to come in contact with the rubber bonded abrasive with a solution of soap in water and dried to remove the water. The assembled blank is then inserted in the mold, canvas side down, and a plunger, which may be engraved to form the surface configurations on the abrasive face of the article and coated with soap, is inserted in the mold. The mold is put into a suitably heated hot-press and a pressure of 100-200 pounds per square inch is applied for about five minutes, the temperature of the platens being that corresponding to 60 pounds per square inch gauge steam pressure (308° Fahr.) to allow the mix to become thoroughly heated throughout. The pressure on the mold is then increased to about 2000 pounds per square inch and held for about 15 minutes. The partially cured article is then removed from the mold and put on a plane support, such as a ceramic plate, with the canvas side down. When an indented surface is formed, fine abrasive grain is sprinkled over the disc until all indentations are filled so that another flat plate may be placed on top of the disc without causing the raised portions of the disc face to spread or flow. The vulcanization is completed by heating in an oven for about three hours at approximately 300° Fahr., whereupon the disc is removed from the plates and cleaned, and dressed, if necessary, to remove any irregularities, or excess material.

Instead of compacting the mix by passing through rolls and then later pressing the assembled article at 2000 pounds per square inch, equivalent results can be obtained by distributing a suitable quantity of the mix into the mold on top of the tie gum and then, after heating the mix under low pressure, applying a high pressure of the order of 5000 pounds per square inch and holding this pressure for about 15 minutes, followed by vulcanizing in an oven as just described.

As suggested above, another alternative for developing suitable friability comprises adding a filler, such as wood-flour, in quantities sufficient to weaken the rubber the amount required. When this optional method is employed, it is not necessary to overcure the rubber, but it is feasible to employ a combination of these methods by employing a smaller amount of filler and over-curing by a smaller amount than is necessary when no filler is added. Furthermore, instead of wood-flour, I may use other fillers of a similar character such as cork-dust, corn-cob flour, or corn-cob piths. The exact amount of any filler required is dependent upon the kind of filler, the fineness of the filler, the time of cure, and is readily determinable by one skilled in the art.

A commonly accepted indication of friability is tensile strength. The usual abrasive articles, such as grinding wheels and discs, have tensile strengths of 800 pounds per square inch or more, 1000 pounds per square inch being about the usual lower limit. The abrasive composition used for my lacquer polishing articles has a much lower tensile strength, being usually less than 600 pounds per square inch and preferably about 300 pounds per square inch. As an indication of the compressibilty or cushioning of the abrasive composition, the modulus of elasticity of the abrasive composition employed in my lacquer polishing articles is less than that of usual abrasive articles. The modulus of elasticity for usual rubber or resin bonded abrasive articles is about 1,000,000 pounds or over per square inch, whereas the modulus of elasticity of the composition used in my abrasive articles for lacquer polishing is less than 500,000 pounds per square inch and usually about 10,000 pounds per square inch.

In addition to the qualities of friability and of softness or cushioning, the bond used should be such that there is no agglomeration of the detached abrasive grains. The bonds that I use do not become sticky in the presence of the water, which is supplied for the usual wet grinding of the lacquer surfaces and therefore prevent agglomeration of the detached abrasive grains.

The article should be sufficiently flexible to follow the contours of the work. This is secured partly by the flexibility or pliability of the abrasive composition employed and partly by the contour of the abrasive composition applied to the canvas backing of the article. The channels through which the water flows for the removal of the detritus assist in making the article flexible, since the layer of abrasive composition at the bottom of the article is relatively thin, and may be even cracked through, if necessary, to secure a considerable flexing of the disc.

These various requisites are met by the abrasive compositions made as above described, especially the composition given in the specific example using the overcure, as this seems to have about the right qualities of friability, cushioning and flexibility for making articles for lacquer polishing. By the use of such articles, the polishing of the lacquer coats on automobile bodies is carried out mechanically with much greater rapidity and economy than by the old process of manual polishing with waterproof abrasive paper.

In the drawings, I have illustrated abrasive articles and assemblies suitable for the smoothing and polishing of automobile bodies.

Referring to the drawings:

Figure 4 is a plan view of one form of a belt;

Figure 5 is a sectional view along the line V—V of Figure 4;

Figure 6 is a plan view of another form of a belt; and

Figure 7 is a sectional view along the line VII—VII of Figure 6.

Figure 1:
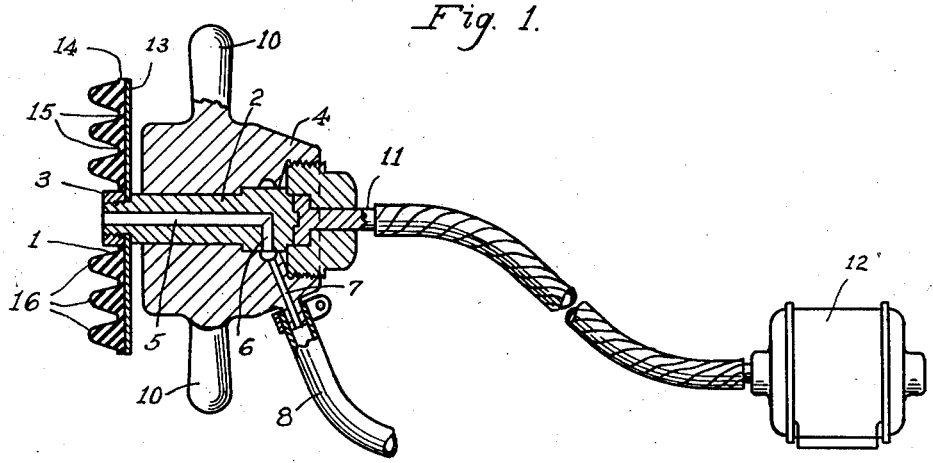
Figure 1 is a view of an abrasive disc assembly embodying my invention.
Figure 2:
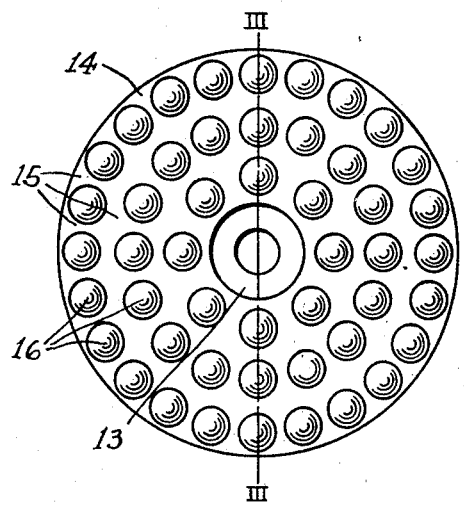
Figure 2 is a plan view of one form of disc.
Figure 3:
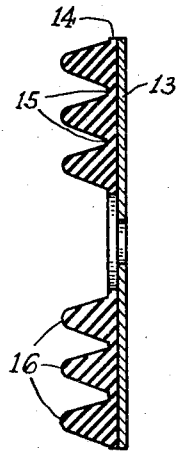
Figure 3 is a sectional view along the line III—III of Figure 2.

In the drawings, Figure 1 represents an abrasive disc 1 mounted on a shaft 2 and held in place by a nut 3. The shaft is supported in a bearing in a housing 4 and is hollowed so as to form a water passage 5 through which water is supplied by means of the ports 6, the water passage 7 in the housing 4, and the hose 8 which is connected to a source of water. Suitable handles 10 on the housing 4 are provided for the workman to manipulate the device. The drive shaft 2 is driven by means of a flexible shaft drive connection 11 connected to any convenient source of power such as a motor 12. The disc 1 consists of a fabric backing 13 and a facing 14 of abrasive composition. In order to assist in the flexibility of the disc and to provide channels or clearance spaces 15 through which the water can flow and wash away the detritus, the abrasive facing of the disc is preferably made up of a number of buttons 16. The thinness of the facing at the bottom of the channels renders the disc more flexible. Moreover, the abrasive coating may be cracked at the bottoms of the channels to give increased flexibility. The abrasive face of the disc is preferably made by molding it into suitable face contour such as illustrated and this is cemented to a suitable base or backing, preferably of a fabric, although other materials possessing the required flexibility may be used, such as rubber, flexible steel, etc. The discs are usually about 6 to 7 inches in diameter and are operated at about 450 to 900 revolutions per minute, giving a linear speed near the periphery of about 750 to 1,500 feet per minute. The discs, having the abrasive composition made and secured to them as hereinbefore described, have the requisite strength for polishing at these speeds.

In smoothing and polishing a lacquer coat, as on an automobile body, the workman applies the rotating flexible disc to the lacquer surfaces, water being supplied to flush away the detritus and prevent overheating. The disc, because of its flexibility, can be applied to the curved and irregular surfaces of the automobile body. The abrasive composition with which the disc is faced, because of its friability and softness, will smooth and grind the lacquer without glazing and without scratching the lacquer, giving a finish equal to, if not superior to, that applied by the laborious hand polishing.

While a disc having button-like projections with water channels between them, such as illustrated, is preferred, other forms of face contours may be employed, preferably contours which will have raised portions separated by valleys, since such contours provide flushing channels for the water, and also provide a maximum of flexibility combined with a sufficient thickness of abrasive composition for good grinding life and economy.

The invention may be also advantageously employed in the making of abrasive belts which may be used, for example, in lacquer polishing instead of the discs previously described or for other similar purposes. A facing of an abrasive composition, such as above described, is sheeted out into a thin sheet and is cemented to a canvas belt backing, in a way similar to which the facing is applied to a canvas disc. Such a belt is adapted to run over pulleys and used for polishing or grinding materials held against the belt. In the event that the facing of bonded abrasive would otherwise make the belt too stiff, either because the coating is thick or because the bond is hard, the desired flexibility may be secured by flexing the belt, so as to crack or break the abrasive coating at regular intervals. This may be done by passing the belt held between protecting strips of canvas over or between rolls which will break the coating at regular intervals. The coating may be broken so that the lines of break may be run straight across the belt, or may be broken so that the lines of break will intersect so as to cause diamond-shaped sections of the bonded abrasive between the flexing breaks. The belts may also be made up of separate strips of abrasive as illustrated in Figures 6 and 7, wherein 17 represents the backing, 18 the tie gum, 19a continuous facing of abrasive broken up as described and 20 represents individual abrasive pieces. The abrasive composition may obviously be made up separately and partially or wholly cured before being assembled with the backing or it may first be assembled and the whole article (abrasive and tie gum) vulcanized simultaneously. Where the friability is to be increased by an overcure, it is usually desirable to partially cure the abrasive composition before assembling in order that it may be overcured without also overcuring the tie gum.

The construction of both the belts and the discs is described and claimed in a copending application by Charles E. Wooddell, Charles S. Nelson and Roy Lincoln, Serial No. 606,632, filed April 21, 1932.

While I have specifically described the preferred embodiment of my invention, it is to be understood that the invention is not so limited, but may be otherwise embodied and practiced within the scope of the following claims.

I claim:

1. An abrasive article for polishing soft surfaces of the general character of lacquered surfaces or the like, which comprises abrasive granules and a bond therefor of the character obtainable by curing the rubber of an aqueous dispersion of previously coagulated rubber to a friable state.

2. An abrasive article for polishing soft surfaces of the general character of lacquered surfaces or the like, which comprises abrasive granules and a bond therefor of the character obtainable by curing a rubber compound to a friable state.

3. An abrasive article for polishing soft surfaces of the general character of lacquered surfaces or the like comprising abrasive granules and a bond therefor of a friable rubber compound.

4. An abrasive article for polishing soft surfaces of the general character of lacquered surfaces or the like, which comprises abrasive grains and a rubber bond therefor which is soft, pliable and friable.

5. An abrasive disk for polishing soft surfaces of the general character of lacquered surfaces or the like, which comprises a flexible backing and a facing of abrasive granules and a soft, pliable and friable rubber binder therefor secured to the backing, said facing having raised portions for contact with the work and channels to increase the flexibility of the disk and for the removal of detritus.

6. An abrasive article for polishing soft surfaces of the general character of lacquered surfaces or the like, which comprises abrasive granules and a friable binder therefor of the character obtainable by vulcanizing a mixture of a dispersion of previously coagulated rubber, woodflour and a vulcanizing agent.

7. An abrasive article for polishing surfaces of relatively soft material, which comprises abrasive granules and a bond therefor of a friable rubber compound.

8. An abrasive article for polishing surfaces of relatively soft material, which comprises abrasive granules and a bond therefor of the character obtainable by curing a rubber compound to a friable state.

9. An abrasive article for polishing surfaces of relatively soft material which comprises abrasive granules and a bond therefor of the character obtainable by curing the rubber of an aqueous dispersion of previously coagulated rubber to a friable state.

10. In the manufacture of abrasive or polishing articles, the method which comprises mixing abrasive particles with a binder therefor containing a dispersion of previously coagulated rubber, forming an article therefrom, and curing the binder to a friable state.

RAYMOND C. BENNER.